United States Patent
Shen et al.

(10) Patent No.: US 12,246,977 B2
(45) Date of Patent: Mar. 11, 2025

(54) BIOAUGMENTATION TREATMENT PROCESS FOR LITHIUM BATTERY PRODUCING WASTEWATER

(71) Applicants: NANJING UNIVERSITY OF SCIENCE AND TECHNOLOGY, Nanjing (CN); ZHENRUN ENVIRONMENTAL SCIENCE AND TECHNOLOGY CO., LTD., Jingmen (CN)

(72) Inventors: Jinyou Shen, Nanjing (CN); Hebing Zhang, Jingmen (CN); Jing Wang, Nanjing (CN); Junfeng He, Jingmen (CN); Xinbai Jiang, Nanjing (CN); Hong Wang, Jingmen (CN); Cheng Hou, Nanjing (CN); Xiaodong Liu, Nanjing (CN)

(73) Assignees: Nanjing University of Science and Technology, Nanjing (CN); Zhenrun Environmental Science and Technology Co., Ltd., Jingmen (CN)

( * ) Notice: Subject to any disclaimer, the term of this patent is extended or adjusted under 35 U.S.C. 154(b) by 408 days.

(21) Appl. No.: 17/883,032

(22) Filed: Aug. 8, 2022

(65) Prior Publication Data
US 2022/0402791 A1    Dec. 22, 2022

Related U.S. Application Data

(63) Continuation of application No. PCT/CN2020/133579, filed on Dec. 3, 2020.

(30) Foreign Application Priority Data

Jul. 23, 2020 (CN) .......................... 202010716618.3

(51) Int. Cl.
C02F 3/30 (2023.01)
C02F 1/52 (2023.01)
(Continued)

(52) U.S. Cl.
CPC ................ *C02F 3/30* (2013.01); *C02F 3/302* (2013.01); *C02F 3/341* (2013.01); *C02F 1/52* (2013.01);
(Continued)

(58) Field of Classification Search
CPC .. C02F 3/30; C02F 3/302; C02F 3/341; C02F 1/52; C02F 3/1268; C02F 2101/16;
(Continued)

(56) References Cited

FOREIGN PATENT DOCUMENTS

CN    103243064 A    8/2013
CN    107935309 A    4/2018
(Continued)

OTHER PUBLICATIONS

Machine-generated English translation of CN 110304785, generated on Nov. 14, 2024.*

*Primary Examiner* — Fred Prince

(57) ABSTRACT

The present invention relates to the technical field of wastewater treatment, and discloses a bioaugmentation treatment process for lithium battery producing wastewater. The method comprises the following steps: 1) introducing wastewater into a hydrolytic acidification tank, and adding *Enterobacter* sp. NJUST50 and activated sludge to the hydrolytic acidification tank for hydrolytic acidification treatment; 2) introducing the effluent into an anoxic tank, and adding *Enterobacter* sp. NJUST50 and anaerobic activated sludge for anoxic treatment; 3) introducing the effluent into an aerobic tank, and adding *Enterobacter* sp. NJUST50 and aerobic activated sludge for aerobic treatment; 4) introducing the effluent into an anoxic filter tank, and adding
(Continued)

*Enterobacter* sp. NJUST50 and anaerobic activated sludge to the filter tank for treatment; and 5) introducing the effluent into a biological aerated filter tank, and adding a sludge mixture of *Enterobacter* sp. NJUST50 with aerobic activated sludge to the filter tank for treatment.

12 Claims, 2 Drawing Sheets

(51) Int. Cl.
    *C02F 3/12*     (2023.01)
    *C02F 3/34*     (2023.01)
    *C02F 101/16*     (2006.01)
    *C02F 101/20*     (2006.01)
    *C02F 101/34*     (2006.01)
    *C02F 101/38*     (2006.01)
    *C02F 103/34*     (2006.01)

(52) U.S. Cl.
    CPC ........ *C02F 3/1268* (2013.01); *C02F 2101/16* (2013.01); *C02F 2101/20* (2013.01); *C02F 2101/34* (2013.01); *C02F 2101/38* (2013.01); *C02F 2103/34* (2013.01); *C02F 2301/08* (2013.01); *C02F 2303/20* (2013.01); *Y02W 10/10* (2015.05)

(58) Field of Classification Search
    CPC .............. C02F 2101/20; C02F 2101/34; C02F 2101/38; C02F 2103/34; C02F 2301/08; C02F 2303/20; Y02W 10/10
    USPC ........ 210/605, 610, 611, 615, 630, 631, 908
    See application file for complete search history.

(56) References Cited

FOREIGN PATENT DOCUMENTS

| | | | |
|---|---|---|---|
| CN | 109913387 A | | 6/2019 |
| CN | 110304785 A | * | 10/2019 |
| CN | 110902979 A | | 3/2020 |
| CN | 111762889 A | | 10/2020 |
| KR | 20170051939 A | | 5/2017 |
| WO | 2016106630 A1 | | 7/2016 |

* cited by examiner

BIOAUGMENTATION TREATMENT PROCESS FOR LITHIUM BATTERY PRODUCING WASTEWATER

CROSS-REFERENCE TO RELATED APPLICATIONS

This application is a continuation of International Application No. PCT/CN2020/133579, filed on Dec. 3, 2020, the disclosure of which is hereby incorporated by reference in its entirety.

TECHNICAL FIELD

The present invention relates to the technical field of wastewater treatment, and discloses a bioaugmentation treatment process for lithium battery producing wastewater.

BACKGROUND

Lithium battery is a relatively clean and rechargeable new energy source having the characteristics of high capacity density and energy density. Lithium battery has become the most promising power battery and is widely used in all walks of life. At present, lithium battery producing wastewater mainly includes cathode and anode cleaning wastewater, in which the main pollutants include N-methylpyrrolidone (NMP), lithium cobaltate, carbon powder, and adhesives, therefore, the components are complex, and poor in biodegradability. The characteristic pollutant namely N-methylpyrrolidone is a nitrogen-containing heterocyclic compound, having a highly stable structure, poor biodegradability and strong biological toxicity. Once lithium battery producing wastewater discharged into the environment were not treated properly and effectively, it will inevitably cause serious harm to the ecological environment and water system.

The treatment processes for lithium battery producing wastewater mainly include biological treatment processes and physical chemistry technologies such as advanced oxidation processes. In the biological treatment processes, simple pretreatment processes such as coagulative precipitation are used, in combination with multi-stage biological treatment processes such as "anaerobic-anoxic-aerobic" treatments. For example, Tian et al. reported a combined process consisted of "electroflocculation-coagulation precipitation-anaerobic treatment-anoxic treatment-aerobic treatment-membrane bioreactor-denitrifying filter tank-nitrifying filter tank-clean water tank" (Tian Rui et al., Engineering Project of Lithium Battery Production Wastewater Treatment and Reuse. Technology of Water Treatment, 2019, 45(6): 127-130). Peng et al. reported a combined process of "coagulation-precipitation-hydrolytic acidification-aerobic treatment-membrane bioreactor" (Peng Jinsheng et al., Improved Process for Treatment of Wastewater from Lithium Battery Production. Resource Saving and Environmental Protection, 2015, 11: 62-63). Due to the toxic effect and poor biodegradability of N-methylpyrrolidone, these biological treatment processes have the disadvantages of high chemical oxygen demand (COD) concentration in the effluent, serious sludge loss, and poor system stability. Moreover, the degradation of particular pollutants such as N-methylpyrrolidone leads to the continuous release of ammonia nitrogen, resulting in a high total nitrogen content in the effluent.

Physical-chemical technologies such as advanced oxidation processes require large consumption of chemicals, resulting in high treatment costs. For example, lithium battery producing wastewater is treated by "Fenton oxidation-coagulation-precipitation-activated carbon filtration" in some plants, where the cost of chemicals alone is as high as 80-100 yuan/ton of water. The "iron-carbon micro-electrolysis-Fenton oxidation" process is used to pretreat lithium battery producing wastewater. Although COD in wastewater can be partly removed, the dosage of iron powder is as high as 150 g/L (Qu Jiongjiong, et al., Fe/C Micro-electrolysis-Fenton Method for Pretreatment of Wastewater from Lithium Battery Cathode Production. Industrial Water Treatment, 2018, 38(5): 25-29).

Therefore, the development of treatment technology and process for lithium battery producing wastewater with stable treatment performance, easy operation and low cost has become an urgent problem that needs to solve in the battery industry. Considering the high concentration of characteristic pollutant namely N-methylpyrrolidone in lithium battery producing wastewater (where the contribution of N-methylpyrrolidone to total organic carbon is as high as 85%-92%), full consideration should be taken in the design of treatment process for lithium battery producing wastewater. However, at present, in the design of biological treatment processes for lithium battery producing wastewater, conventional index such as COD are under consideration, but the refractory N-methylpyrrolidone and the difficulty in total nitrogen removal caused by the release of ammonia nitrogen during the biodegradation of N-methylpyrrolidone are not fully considered.

Based on the above background, the Chinese Patent Application No.: 201910209582.7 published on Jun. 21, 2019 discloses an *Enterobacter* strain that degrades N-methylpyrrolidone and its application in wastewater treatment. The study of *Enterobacter* sp. NJUST50 shows that *Enterobacter* sp. NJUST50 can use N-methylpyrrolidone as the sole carbon source and nitrogen source for growth. However, the strain is only used in anoxic treatment in a small-scale laboratory, the advantages of this strain in biochemical treatment are difficult to be efficiently exerted, and the stability of the biochemical system is not high.

Considering the shortcomings of current technology, there is an urgent need to develop a new low-cost and efficient treatment method for lithium battery producing wastewater based on the application of this strain.

SUMMARY

1. Problem to be Solved

In view of the problems of high N-methylpyrrolidone concentration, high total nitrogen concentration, difficulty in effective removal of these pollutants, high cost, unstability, and difficulty in large-scale application in the treatment of lithium battery producing wastewater, in the present invention, the mixture of *Enterobacter* sp. NJUST50 and activated sludge is used in hydrolytic acidification, primary anoxic treatment, aerobic treatment, secondary anoxic filter tank, and biological aerated filter tank for deep treatment, to enable efficient biodegradation, effectively reduction of the cost, and improvement of the stability of bioaugmentation system.

2. Technical Solution

To solve the above problems, the following technical solution is adopted in the present invention.

The present invention provides a bioaugmentation treatment process for lithium battery producing wastewater. The method comprises the following steps:

1) introducing lithium battery producing wastewater into a hydrolytic acidification tank, and adding the mixture of *Enterobacter* sp. NJUST50 and activated sludge to the hydrolytic acidification tank for hydrolytic acidification treatment, where the activated sludge is consisted of anaerobic and/or facultative anaerobic microorganisms, and *Enterobacter* sp. NJUST50 is deposited in China Center for Type Culture Collection under CCTCC Accession NO: M2019128;

2) introducing the wastewater after treatment in step 1) into an anoxic tank, and adding the mixture of *Enterobacter* sp. NJUST50 with anaerobic activated sludge to the tank for anoxic treatment;
3) introducing the wastewater after treatment in step 2) into an aerobic tank, and adding the mixture of *Enterobacter* sp. NJUST50 and aerobic activated sludge to the tank for aerobic treatment;
4) introducing the wastewater after treatment in step 3) into an anoxic filter tank, and adding the mixture of *Enterobacter* sp. NJUST50 with anaerobic activated sludge to the filter tank for anoxic treatment;
5) introducing the wastewater after treatment in step 4) into a biological aerated filter tank, and adding the mixture of *Enterobacter* sp. NJUST50 with aerobic activated sludge to the filter tank for aerobic treatment.

The lithium battery producing wastewater contains a large amount of N-methylpyrrolidone and ammonia nitrogen, and has a high COD concentration. In the technical solution of the present invention, the mixture of *Enterobacter* sp. NJUST50 and activated sludge is respectively used in the various treatment procedures in hydrolytic acidification-anoxic-aerobic-anoxic filter tank-biological aerated filter tank. By the cooperation between anoxic and aerobic treatments of various steps, efficient removal of N-methylpyrrolidone and ammonia nitrogen from wastewater through bioaugmentation is achieved, thus reducing the operation cost.

*Enterobacter* sp. NJUST50 is a bacterium belonging to *Enterobacter* sp. that can utilize N-methylpyrrolidone as an electron donor to carry out denitrification for nitrate removal, which is identified as a member of *Enterobacter* sp. by molecular biology, and named as *Enterobacter* sp. NJUST50. This strain is deposited on Mar. 6, 2019 in the China Center for Type Culture Collection (CCTCC, address: Wuhan University, Wuhan, China) under CCTCC Accession NO: M2019128. The *Enterobacter* sp. NJUST50 has been disclosed in the Chinese Patent Application No. 201910209582.7.

According to a preferred embodiment, lithium battery producing wastewater in step 1) has been pretreated by sedimentation-coagulation-precipitation.

According to a preferred embodiment, after pretreatment by sedimentation-coagulation-precipitation, COD content of the lithium battery producing wastewater in the range of 3200-3500 mg/L, N-methylpyrrolidone content in the range of 2100-2400 mg/L, ammonia nitrogen content of 4-10 mg/L, and a total nitrogen content of 300-400 mg/L.

Step 1) aims to hydrolyze some refractory macromolecular substances in wastewater into readily biodegradable small molecular substances through the hydrolysis and acidification by *Enterobacter* sp. NJUST50, anaerobic and/or facultative anaerobic bacteria, and convert the small molecular substances into volatile fatty acids through acidification by anaerobic bacteria, thereby improving the biodegradability of wastewater.

Step 2) aims at efficient biodegradation of N-methylpyrrolidone and nitrogen removal by denitrification through the metabolism and growth of *Enterobacter* sp. NJUST50 and denitrifying bacteria in anaerobic activated sludge under anoxic condition, by using N-methylpyrrolidone as an electron donor and nitrate generated from the subsequent aerobic tank as an electron acceptor. In addition, N-methylpyrrolidone biodegradation process could be accelerated through the addition of ZVI (Zero Valent Iron, such as iron shavings, 6 kg/m$^3$) into the anoxic tank, which can serve as auxiliary electron donor and increase electron transfer efficiency simultaneously.

Step 3) aims to further degrade the organic pollutants in the wastewater and generate the electron acceptor nitrate by nitrification reaction.

Step 4) aims to further degrade pollutants such as N-methylpyrrolidone, and realize the nitrogen removal by denitrification and the release of ammonia nitrogen simultaneously. In this step, the nitrate generated from the nitrification reaction can be fully utilized as an electron acceptor to degrade residual N-methylpyrrolidone and other pollutants, thus further reducing COD in the wastewater.

Step 5) aims to further degrade the residual organic pollutants and COD in the wastewater, and generate the electron acceptor nitrate by a nitrification reaction simultaneously.

In the present invention, the five collaborative steps can not only enable targeted removal of N-methylpyrrolidone and total nitrogen, but also comprehensively remove the overall COD. A mixture of *Enterobacter* sp. NJUST50 and activated sludge in various reaction stages can not only improve the removal efficiency, but also improve the shock resistance, which is beneficial to the improvement of the stability of the whole biochemical system.

According to a preferred embodiment, the method further comprises a step 6). The step is specifically:

6) entering the effluent after treatment in step 5) into a membrane bioreactor for solid-liquid separation treatment.

Step 6) mainly functions to trap the suspended substances in the wastewater, and further degrade the residual organic pollutants and COD in the wastewater.

According to a preferred embodiment, the mixing ratio of *Enterobacter* sp. NJUST50 and the anaerobic activated sludge in steps 1) and 2) and 4) is 1:5, and/or the mixing ratio of *Enterobacter* sp. NJUST50 and the aerobic activated sludge in steps 3) and 5) is 1:5 on basis of dry weight of the sludge.

According to a preferred embodiment, the hydraulic retention time in the hydrolytic acidification tank in step 1) is set as 16-24 hrs, and the organic load is 3.50-5.30 kgCOD/m$^3$/d; and/or the hydraulic retention time in the anoxic tank in step 2) is set as 48-72 hrs, and the organic load is 0.23-0.35 kgCOD/m$^3$/d; and/or the hydraulic retention time in the aerobic tank in step 3) is set as 48-72 hrs, and the organic load is 0.07-0.11 kgCOD/m$^3$/d; and/or the hydraulic retention time in the anoxic filter tank in step 4) is set as 16-24 hrs, and the organic load is 0.34-0.51 kgCOD/m$^3$/d; and/or the hydraulic retention time in the biological aerated filter tank in step 5) is set as 8-10 hrs, and the organic load is 0.14-0.17 kgCOD/m$^3$/d.

According to a preferred embodiment, the sludge mixture inoculated in the hydrolytic acidification tank in step 1) is 5 kg/m$^3$; and/or the sludge mixture inoculated in the anoxic tank in step 2) is 5 kg/m$^3$; and/or the sludge mixture inoculated in the aerobic tank in step 3) is 3 kg/m$^3$; and/or the sludge mixture inoculated in the anoxic filter tank in step 4) is 1 kg/m$^3$; and/or the sludge mixture inoculated in the biological aerated filter tank in step 5) is 1 kg/m$^3$.

According to a preferred embodiment, during the treatment in the anoxic tank, a diluted sulfuric acid solution is required to be added to adjust the pH to 6.5-7.0, because both the N-methylpyrrolidone biodegradation and denitrification will release alkalinity, so the pH needs to be adjusted to an appropriate range.

According to a preferred embodiment, during the treatment in the anoxic tank, ZVI (such as iron shavings, 6 kg/m$^3$) could be added into the anoxic tank in order to improve N-methylpyrrolidone biodegradation process.

During the treatment in the aerobic tank, sodium hydroxide solution needs to be added to adjust the pH to 7.5-8.0, because the nitrification of ammonia nitrogen releases acidity, so the pH in the aerobic tank also needs to be adjusted to an appropriate range.

According to a preferred embodiment, glucose is added in the anoxic filter tank to ensure nitrate removal through denitrification at glucose concentration is 0.2 kg/m$^3$.

According to a preferred embodiment, the effluent after treatment in step 3) is refluxed to the anoxic tank in step 2), to provide nitrate as an electron acceptor to enhance the biodegradation of N-methylpyrrolidone and the nitrogen removal by denitrification.

According to a preferred embodiment, the effluent after treatment in step 5) is refluxed to the anoxic filter tank in step 4), to enhance the nitrogen removal by denitrification.

According to a preferred embodiment, the method specifically comprises the following steps.

(1) The wastewater pretreated by sedimentation-coagulation-precipitation is entered into a hydrolytic acidification tank, and a sludge mixture of the *Enterobacter* sp. NJUST50 (deposited under CCTCC Accession NO: M2019128) with activated sludge is added to the hydrolytic acidification tank, where the sludge mixture is inoculated at 5 kg/m$^3$ (the sludge concentration is on dry weight basis, and the dry weight ratio of *Enterobacter* sp. NJUST50 to the anaerobic activated sludge is 1:5), the hydraulic retention time in the hydrolytic acidification tank is set as 16-24 hrs, and the activated sludge comprises anaerobic and facultative anaerobic bacteria.

(2) The effluent from the hydrolytic acidification tank is introduced to an anoxic tank, and a sludge mixture of the *Enterobacter* sp. NJUST50 with activated sludge is added to the tank, where the sludge mixture is inoculated at a concentration of 5 kg/m$^3$ (the sludge concentration is on dry weight basis, and the dry weight ratio of *Enterobacter* sp. NJUST50 to the activated sludge is 1:5), and the hydraulic retention time in the anoxic tank is set as 48-72 hrs. N-methylpyrrolidone serves as the electron donor and nitrate generated from the subsequent aerobic tank serves as the electron acceptor, to realize efficient N-methylpyrrolidone biodegradation and nitrogen removal by denitrification. In addition, N-methylpyrrolidone biodegradation process could be accelerated through the addition of ZVI (such as iron shavings, 6 kg/m$^3$) into the anoxic tank, which can serve as auxiliary electron donor and increase electron transfer efficiency simultaneously. Dilute sulfuric acid is added to adjust the pH to 6.5-7.0 to maintain a proper pH value.

(3) The effluent from the anoxic tank is introduced to an aerobic tank, and a sludge mixture of the *Enterobacter* sp. NJUST50 with activated sludge is added to the tank, where the sludge mixture is inoculated at 3 kg/m$^3$ (the sludge concentration is on dry weight basis, and the dry weight ratio of *Enterobacter* sp. NJUST50 to the activated sludge is 1:5), and the hydraulic retention time in the aerobic tank is set as 48-72 hrs. Because the nitrification of ammonia nitrogen will release acidity, a sodium hydroxide solution is added in the aerobic tank to adjust the pH to 7.5-8.0 to maintain a proper pH value.

(4) The effluent from the aerobic tank is pumped into an anoxic filter tank containing spherical polyurethane filter material, and a sludge mixture of the *Enterobacter* sp. NJUST50 with activated sludge is added, where the sludge mixture is inoculated at 1 kg/m$^3$ (the sludge concentration is on dry weight basis, and the dry weight ratio of the *Enterobacter* sp. NJUST50 to the activated sludge is 1:5), and the hydraulic retention time in the anoxic filter tank is set as 16-24 hrs. This step mainly to further degrade pollutants such as N-methylpyrrolidone by using nitrate generated from nitration, and simultaneously realize the nitrogen removal by denitrification and the release of ammonia nitrogen. In this step, in order to ensure the removal of total nitrogen, 0.2 kg/m$^3$ glucose needs to be added as an auxiliary electron donor.

(5) The effluent from the anoxic filter tank is introduced into a biological aerated filter tank containing spherical polyurethane filter material, and a sludge mixture of the *Enterobacter* sp. NJUST50 with activated sludge is added and inoculated at 1 kg/m$^3$ (the sludge concentration is on dry weight basis, and the dry weight ratio of the *Enterobacter* sp. NJUST50 to the activated sludge is 1:5). This step mainly to further degrade residual organic compounds in the wastewater, and oxidize ammonia nitrogen into nitrate, which is then refluxed to the anoxic filter tank, to realize the function of biological nitrogen removal. The hydraulic retention time in the biological aerated filter tank is set as 16-24 hrs.

(6) The wastewater is discharged from the biological aerated filter tank to a membrane bioreactor, where the hydraulic retention time in the membrane bioreactor is set as 8-10 hrs. The membrane bioreactor has efficient solid-liquid separation performance, and can trap biological membrane and other suspended substances carried in the wastewater and further degrade the organic matter and COD. Aeration disturbance is arranged in a lower part of the membrane bioreactor, to slow down the membrane fouling. The sludge in the membrane bio-reactor is refluxed to the front biological aerated filter tank, and the effluent is discharge up to standard.

3. Beneficial Effects

Compared with the prior art, the present invention has the following beneficial effects.

(1) In the bioaugmentation treatment process for lithium battery producing wastewater according to the present invention, a mixture of the *Enterobacter* sp. NJUST50 and activated sludge is used in hydrolytic acidification, primary anoxic treatment, aerobic treatment, secondary anoxic filter tank, and biological aerated filter tank treatment. First, some N-methylpyrrolidone and refractory macromolecular substances in the wastewater are digested by hydrolytic acidification, to improve the biodegradability of the wastewater. Then, anoxic biodegradation of N-methylpyrrolidone, the release of ammonia nitrogen, and nitrogen removal by denitrification are simultaneously realized through the metabolism and growth of the *Enterobacter* sp. NJUST50 and denitrifying bacteria in the anaerobic activated sludge under anoxic condition, by using N-methylpyrrolidone as an electron donor and nitrate from the subsequent aerobic tank as an electron acceptor. In the subsequent aerobic treatment, through the nitrification by nitrifying bacteria, ammonia nitrogen produced in the anoxic procedure is oxidized into nitrate, the organic pollutants in the wastewater are degraded, and a nitrification reaction takes place. Finally, through the deep treatments by denitrification in the anoxic filter tank and the nitrification in the biological aerated filter tank, organic pollutants such as residual N-methylpyrrolidone are further degraded, to simultaneously realize the removal of high-concentration total nitrogen. Various procedures cooperate in an orderly manner to perform different functions. The close cooperation of various procedures enables the use various pollutants as the useful substances in the next procedure, which not only improves the degradation efficiency of N-methylpyrrolidone and refractory macromolecular substances as a whole, but also effectively reduces the costs.

(2) In the bioaugmentation treatment process for lithium battery producing wastewater according to the present invention, a membrane bioreactor is further included for subsequent treatment, the membrane bioreactor can trap biological membrane and other suspended substances carried in the wastewater and further degrade the residual organic matter and COD in the wastewater. The sludge is refluxed to the front biological aerated filter tank, and the effluent is discharge up to standard.

(3) In the bioaugmentation treatment process for lithium battery producing wastewater according to the present invention, a sludge mixture of *Enterobacter* sp. NJUST50 with activated sludge is used in various reaction stages to perform different functions, which can not only improve the reaction efficiency, but also improve the impact resistance of the whole system, and is thus beneficial to improve the stability of the whole biochemical system. This method has the advantages of wide scope of use, high system stability, good stable treatment effect, and low production cost. Moreover, the method achieves bioaugmentation treatment of lithium battery producing wastewater, and reduce the pollution of lithium battery producing wastewater to the environment and ecosystem.

DETAILED DESCRIPTION

The present invention is further described below with reference to specific embodiments.

The terms used in the present invention, unless otherwise stated, generally have the meaning commonly understood by a person of ordinary skill in the art. The present invention is further described in detail below with reference to specific embodiments and data. It should be understood that, the embodiments are only for describing the present invention by using examples, but do not limit the scope of the present invention in any manner. In the following embodiments, various processes and methods that are not described in detail are common conventional methods in the art.

Example 1

Figure 1:
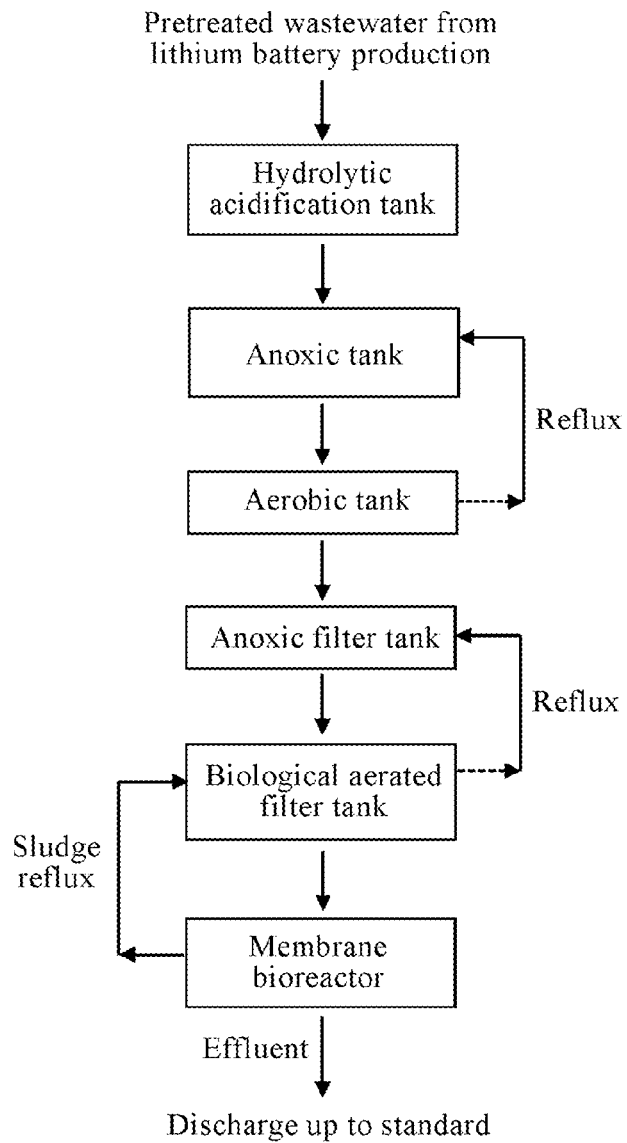
FIG. 1 shows a bioaugmentation combined process for lithium battery producing wastewater in Example 1.

The wastewater pretreated by sedimentation-coagulation-precipitation in a lithium battery production plant is taken as an example, in which the COD concentration is in the range of 3200-3500 mg/L, the N-methylpyrrolidone concentration is in the range of 2100-2400 mg/L, the ammonia nitrogen concentration is in the range of 4-10 mg/L, and the total nitrogen concentration is in the range of 300-400 mg/L. The bioaugmentation combined process of "hydrolytic acidification-anoxic treatment-aerobic treatment-anoxic filter tank-biological aerated filter tank-membrane bioreactor" in the present invention is shown in FIG. 1. The specific steps are as follows.

1) The wastewater pretreated by sedimentation-coagulation-precipitation is entered into a hydrolytic acidification tank, where the hydraulic retention time is set as 16-24 hrs, and the organic load is 3.50-5.30 kgCOD/m$^3$/d; and a sludge mixture of the *Enterobacter* sp. NJUST50 (deposited under CCTCC Accession NO: M2019128) with anaerobic activated sludge is added to the hydrolytic acidification tank, where the sludge mixture is inoculated at 5 kg/m$^3$ (the sludge concentration is on dry weight basis, and the dry weight ratio of *Enterobacter* sp. NJUST50 to the anaerobic activated sludge is 1:5), and the activated sludge comprises anaerobic and facultative anaerobic bacteria. Through hydrolysis by anaerobic or facultative anaerobic bacteria, refractory macromolecular substances in the wastewater are hydrolyzed into readily biodegradable small molecular substances through the hydrolysis and acidification, and then the small molecular substances are converted into volatile fatty acids through acidification by anaerobic bacteria.

2) The effluent from the hydrolytic acidification tank is introduced to an anoxic tank, where the hydraulic retention time is set as 48-72 hrs, and the organic load is 0.23-0.35 kgCOD/m$^3$/d; and a sludge mixture of the *Enterobacter* sp. NJUST50 with activated sludge is added to the tank, where the sludge mixture is inoculated at a concentration of 5 kg/m$^3$ (the sludge concentration is on dry weight basis, and the dry weight ratio of *Enterobacter* sp. NJUST50 to the activated sludge is 1:5). Dilute sulfuric acid is added in the tank to adjust the pH to 6.5-7.0 to maintain a proper pH value. By taking advantage of nitrate generated from aerobic tank denitrification and biodegradation of N-methylpyrrolidone are carried out.

3) The effluent is introduced into an aerobic tank, where the hydraulic retention time is set as 48-72 hrs, and the organic load is 0.07-0.11 kgCOD/m$^3$/d; and a sludge mixture of the *Enterobacter* sp. NJUST50 with activated sludge is added to the tank, where the sludge mixture is inoculated at 3 kg/m$^3$ (the sludge concentration is on dry weight basis, and the dry weight ratio of *Enterobacter* sp. NJUST50 to the activated sludge is 1:5). Because the nitrification of ammonia nitrogen will release acidity, a sodium hydroxide solution is added in the aerobic tank to adjust the pH to 7.5-8.0 to maintain a proper pH value. This step functions to further degrade residual COD in the wastewater in the aerobic tank, and oxidize ammonia nitrogen into nitrate under the action of nitrifying bacteria, which is then refluxed to the anoxic tank, to achieve the biological nitrogen removal by a combination with denitrifying bacteria.

4) The effluent from the aerobic tank is introduced into an anoxic filter tank, where the hydraulic retention time is set as 16-24 hrs, the organic load is 0.34-0.51 kgCOD/m$^3$/d, and spherical polyurethane is contained in the anoxic filter tank as a filter material; and a sludge mixture of the *Enterobacter* sp. NJUST50 with activated sludge is added, where the sludge mixture is inoculated at 1 kg/m$^3$ (the sludge concentration is on dry weight basis, and the dry weight ratio of the *Enterobacter* sp. NJUST50 to the activated sludge is 1:5). Through using nitrate generated from nitration, this step mainly to further degrade pollutants such as N-methylpyrrolidone, and simultaneously realize the nitrogen removal by denitrification and the release of ammonia nitrogen. In this step, in order to ensure the removal of total nitrogen, 0.2 kg/m$^3$ of glucose needs to be added as an auxiliary electron donor.

5) The effluent from the anoxic filter tank is introduced into a biological aerated filter tank, where the hydraulic retention time is set as 16-24 hrs, the organic load is 0.05-0.08 kg COD/m$^3$/d, and spherical polyurethane is contained in the biological aerated filter tank as a filter material; and a sludge mixture of the *Enterobacter* sp. NJUST50 with activated sludge is added and inoculated at 1 kg/m$^3$ (the sludge concentration is on dry weight basis, and the dry weight ratio of the *Enterobacter* sp. NJUST50 to the activated sludge is 1:5). This step in order to further remove residual organic matter and COD in the wastewater, and oxidize ammonia nitrogen into nitrate, which is then refluxed to the anoxic filter tank, to realize the function of biological nitrogen removal.

6) The effluent from the biological aerated filter tank is introduced to a membrane bioreactor, where the hydraulic retention time is set as 8-10 hrs, and the organic load is 0.14-0.17 kgCOD/m$^3$/d. This step aims to trap biological membrane and other suspended substances carried in the wastewater. The sludge is refluxed to the front biological aerated filter tank, and the effluent is discharge up to standard. The removal efficiencies of various procedures in the bioaugmentation combined process of "hydrolytic-acidification-anoxic treatment-aerobic treatment-anoxic filter tank-biological aerated filter tank-membrane bioreactor" under stable working conditions are shown in Table 1.

TABLE 1

Water quality index of effluent from various procedures of the combined process

| Treatment unit | Index | COD$_{cr}$ (mg/L) | NMP (mg/L) | NH$_3$—N (mg/L) | TN (mg/L) | TP (mg/L) | SS (mg/L) |
|---|---|---|---|---|---|---|---|
| Hydrolysis acidification tank | Influent | 3200-3500 | 2100-2400 | 4-10 | 300-400 | 0.4-0.5 | 40-50 |
|  | Effluent | 2000-2100 | 1300-1450 | 240-270 | 300-320 | 0.3-0.4 | 85-100 |
| Anoxic tank | Influent | 2000-2100 | 1300-1450 | 240-270 | 300-320 | 0.3-0.4 | 85-100 |
|  | Effluent | 550-650 | 350-440 | 330-360 | 400-430 | 0.3-0.4 | 85-100 |
| Aerobic tank | Influent | 550-650 | 350-440 | 330-360 | 400-430 | 0.3-0.4 | 85-100 |
|  | Effluent | 90-110 | 61-75 | 35-45 | 55-65 | 0.2-0.3 | 85-100 |
| Anoxic filter tank | Influent | 90-110 | 61-75 | 35-45 | 55-65 | 0.2-0.3 | 85-100 |
|  | Effluent | 25-35 | 17-25 | 3-4 | 5-10 | 0.2-0.3 | 40-50 |
| Biological aerated filter tank | Influent | 25-35 | 17-25 | 3-4 | 5-10 | 0.2-0.3 | 40-50 |
|  | Effluent | 20-25 | 13-15 | 3-4 | 5-10 | 0.2-0.3 | 40-50 |
| Membrane bio-reactor | Influent | 20-25 | 13-15 | 3-4 | 5-10 | 0.2-0.3 | 40-50 |
|  | Effluent | 15-19 | 10-13 | 1-2 | 5-10 | 0.2-0.3 | 2-4 |

The costs in the treatment of wastewater by the bioaugmentation combined process of "hydrolytic acidification-anoxic-aerobic-anoxic filter tank-biological aerated filter tank-membrane bioreactor" mainly include chemical cost, electricity cost, and labor cost etc., which are 10.56 yuan/ton of wastewater in total. The chemical cost mainly includes dilute sulfuric acid, sodium hydroxide, glucose and other consumables, and is estimated to be 1.24 yuan/ton of wastewater. The consumption of electricity mainly is attributed to the operation of air compressors, dosing pumps, feed pumps and others, and the electricity cost is estimated to be 9.32 yuan/ton of wastewater. The on-site operators are part-time employees of the production department, and the labor cost is not included. If the wastewater from lithium battery production is treated by "Fenton oxidation-coagulation-precipitation-activated carbon filtration", where the cost of chemicals alone is as high as 80-100 yuan/ton of water. The costs in the treatment of wastewater by the bioaugmentation combined process of "hydrolytic acidification-anoxic-aerobic-anoxic filter tank-biological aerated filter tank-membrane bioreactor" is far less than the cost of the combined process of Fenton oxidation-coagulation-precipitation-activated carbon filtration, and thus has significant economic benefits.

Comparative Example

Figure 2:
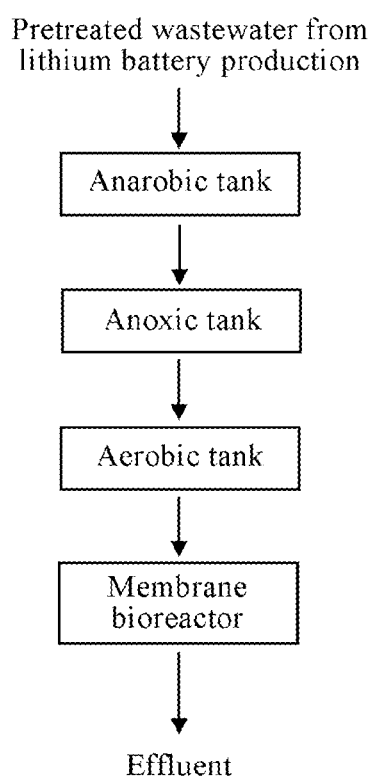
FIG. 2 shows a combined process for lithium battery producing wastewater in the comparative example.

In the comparative example, a combined process of "anaerobic treatment-anoxic treatment-aerobic treatment-membrane bioreactor" is used, and the process is as shown in FIG. 2. The influent water quality and operating parameters of each section are the same as those in Example 1, except that a common anaerobic sludge is inoculated in the anaerobic tank, and a common activated sludge is inoculated in the anoxic tank and the aerobic tank. The removal efficiencies of each procedure under stable operating conditions is shown in Table 2. COD in the anaerobic reaction procedure inoculated with anaerobic sludge is reduced from 3200-3500 mg/L to 2100-2300 mg/L, and N-methylpyrrolidone is reduced from 2100-2400 mg/L to 1400-1550 mg/L. COD in the anoxic reaction procedure inoculated with common activated sludge is reduced to 1600-1800 mg/L, and N-methylpyrrolidone is reduced to 1050-1250 mg/L. COD in the aerobic reaction procedure inoculated with common activated sludge is reduced to about 850-900 mg/L, and N-methylpyrrolidone is reduced to 540-610 mg/L. COD in the membrane bioreactor is further reduced to 520-550 mg/L, and N-methylpyrrolidone is reduced to 340-370 mg/L, The wastewater cannot be discharged up to standard.

TABLE 2

Water quality index of effluent from various procedures of the combined process

| Treatment unit | Indicator | COD$_{cr}$ (mg/L) | NMP (mg/L) | NH$_3$—N (mg/L) | TN (mg/L) | TP (mg/L) | SS (mg/L) |
|---|---|---|---|---|---|---|---|
| Anaerobic tank | Influent | 3200-3500 | 2100-2400 | 4-10 | 300-400 | 0.4-0.5 | 40-50 |
|  | Effluent | 2100-2300 | 1400-1550 | 250-280 | 300-350 | 0.3-0.4 | 95-110 |
| Anoxic tank | Influent | 2100-2300 | 1400-1550 | 250-280 | 300-350 | 0.3-0.4 | 95-110 |
|  | Effluent | 1600-1800 | 1050-1250 | 300-320 | 350-380 | 0.3-0.4 | 95-110 |
| Aerobic tank | Influent | 1600-1800 | 1050-1250 | 300-320 | 350-380 | 0.3-0.4 | 95-110 |
|  | Effluent | 850-900 | 540-610 | 100-110 | 120-140 | 0.2-0.3 | 50-60 |
| Membrane bio-reactor | Influent | 850-900 | 540-610 | 100-110 | 120-140 | 0.2-0.3 | 50-60 |
|  | Effluent | 520-550 | 340-370 | 55-70 | 70-80 | 0.2-0.3 | 30-40 |

What is claimed is:

1. A bioaugmentation treatment process for lithium battery producing wastewater, comprising the following steps:
   1) introducing lithium battery producing wastewater into a hydrolytic acidification tank, and adding a sludge mixture of *Enterobacter* sp. NJUST50 and anaerobic activated sludge to the hydrolytic acidification tank for hydrolytic acidification treatment, wherein the *Enterobacter* sp. NJUST50 is deposited in China Center for Type Culture Collection under CCTCC Accession NO: M2019128;
   2) introducing the wastewater after treatment in step 1) into an anoxic tank, and adding a sludge mixture of the *Enterobacter* sp. NJUST50 with anaerobic activated sludge to the tank for anoxic treatment;
   3) introducing the wastewater after treatment in step 2) into an aerobic tank, and adding a sludge mixture of the *Enterobacter* sp. NJUST50 and aerobic activated sludge to the tank for aerobic treatment;
   4) introducing the wastewater after treatment in step 3) into an anoxic filter tank, and adding a sludge mixture of the *Enterobacter* sp. NJUST50 with anaerobic activated sludge to the filter tank for anoxic treatment; and
   5) introducing the wastewater after treatment in step 4) into a biological aerated filter tank, and adding a sludge mixture of the *Enterobacter* sp. NJUST50 with aerobic activated sludge to the filter tank for aerobic treatment.

2. The bioaugmentation treatment process for lithium battery producing wastewater according to claim 1, further comprising step 6) that is specifically:
   6) entering an effluent after treatment in step 5) into a membrane bioreactor for solid-liquid separation treatment.

3. The bioaugmentation treatment process for lithium battery producing wastewater according to claim 2, wherein the mixing ratio of the *Enterobacter* sp. NJUST50 and the anaerobic activated sludge in steps 1), 2) and 4) is 1:5 on basis of dry weight of the sludge, and/or the mixing ratio of the *Enterobacter* sp. NJUST50 and the aerobic activated sludge in steps 3) and 5) is 1:5 on basis of dry weight of the sludge.

4. The bioaugmentation treatment process for lithium battery producing wastewater according to claim 2, wherein the lithium battery producing wastewater in step 1) has been pretreated by sedimentation-coagulation-precipitation.

5. The bioaugmentation treatment process for lithium battery producing wastewater according to claim 1 wherein the mixing ratio of the *Enterobacter* sp. NJUST50 and the anaerobic activated sludge in steps 1), 2) and 4) is 1:5 on basis of dry weight of the sludge, and/or the mixing ratio of the *Enterobacter* sp. NJUST50 and the aerobic activated sludge in steps 3) and 5) is 1:5 on basis of dry weight of the sludge.

6. The bioaugmentation treatment process for lithium battery producing wastewater according to claim 5, wherein the hydraulic retention time in the hydrolytic acidification tank in step 1) is set as 16-24 hrs, and an organic load is 3.50-5.30 $kgCOD/m^3/d$; and/or the hydraulic retention time in the anoxic tank in step 2) is set as 48-72 hrs, and an organic load is 0.23-0.35 $kgCOD/m^3/d$; and/or the hydraulic retention time in the aerobic tank in step 3) is set as 48-72 hrs, and an organic load is 0.07-0.11 $kgCOD/m^3/d$; and/or the hydraulic retention time in the anoxic filter tank in step 4) is set as 16-24 hrs, and an organic load is 0.34-0.51 $kgCOD/m^3/d$; and/or the hydraulic retention time in the biological aerated filter tank in step 5) is set as 8-10 hrs, and an organic load is 0.14-0.17 $kgCOD/m^3/d$.

7. The bioaugmentation treatment process for lithium battery producing wastewater according to claim 6, wherein the sludge mixture inoculated in the hydrolytic acidification tank in step 1) is 5 $kg/m^3$; and/or the sludge mixture inoculated in the anoxic tank in step 2) is 5 $kg/m^3$; and/or the sludge mixture inoculated in the aerobic tank in step 3) is 3 $kg/m^3$; and/or the sludge mixture inoculated in the anoxic filter tank in step 4) is 1 $kg/m^3$; and/or the sludge mixture inoculated in the biological aerated filter tank in step 5) is 1 $kg/m^3$.

8. The bioaugmentation treatment process for lithium battery producing wastewater according to claim 1, wherein the lithium battery producing wastewater in step 1) has been pretreated by sedimentation-coagulation-precipitation.

9. The bioaugmentation treatment process for lithium battery producing wastewater according to claim 8, wherein in the anoxic tank, a diluted sulfuric acid solution is required to be added to adjust the pH to 6.5-7.0, and in the aerobic tank, a sodium hydroxide solution needs to be added to adjust the pH to 7.5-8.0.

10. The bioaugmentation treatment process for lithium battery producing wastewater according to claim 9, wherein ZVI is added into the anoxic tank, and the amount of ZVI is 6 $kg/m^3$.

11. The bioaugmentation treatment process for lithium battery producing wastewater according to claim 10, wherein glucose is added in the anoxic filter tank, and the amount of glucose is 0.2 $kg/m^3$.

12. The bioaugmentation treatment process for lithium battery producing wastewater according to claim 10, wherein an effluent after treatment in step 3) is refluxed to the anoxic tank in step 2), and an effluent after treatment in step 5) is refluxed to the anoxic filter tank in step 4).

* * * * *